United States Patent
Rofougaran et al.

(10) Patent No.: US 8,838,028 B2
(45) Date of Patent: Sep. 16, 2014

(54) MULTI-MODE CELLULAR IC FOR MULTI-MODE COMMUNICATIONS

(75) Inventors: Ahmadreza (Reza) Rofougaran, Newport Coast, CA (US); Maryam Rofougaran, Rancho Palos Verdes, CA (US); Hooman Darabi, Laguna Niguel, CA (US); Vafa James Rakshani, Newport Coast, CA (US); Claude G. Hayek, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 673 days.

(21) Appl. No.: 13/049,566

(22) Filed: Mar. 16, 2011

(65) Prior Publication Data

US 2011/0165842 A1 Jul. 7, 2011

Related U.S. Application Data

(63) Continuation of application No. 12/056,493, filed on Mar. 27, 2008, now Pat. No. 7,929,939.

(60) Provisional application No. 60/953,426, filed on Aug. 1, 2007.

(51) Int. Cl.
*H04B 7/00* (2006.01)
*H04B 1/40* (2006.01)

(52) U.S. Cl.
CPC .................................. *H04B 1/406* (2013.01)
USPC ........... 455/41.2; 455/73; 455/90.3; 455/333; 455/507; 455/552.1

(58) Field of Classification Search
CPC .................. H04B 1/406; H04B 1/40

USPC ........... 455/41.2, 333, 552.1, 553.1, 73, 90.3, 455/507
See application file for complete search history.

(56) References Cited

U.S. PATENT DOCUMENTS

| | | | | |
|---|---|---|---|---|
| 5,754,948 | A * | 5/1998 | Metze | 455/41.2 |
| 6,942,157 | B2 * | 9/2005 | Nozawa et al. | 235/492 |
| 7,062,225 | B2 * | 6/2006 | White | 455/41.2 |
| 7,113,230 | B1 * | 9/2006 | Genovese et al. | 348/731 |
| 7,257,093 | B1 * | 8/2007 | Witzke et al. | 370/310.1 |
| 7,330,702 | B2 * | 2/2008 | Chen et al. | 455/73 |
| 7,428,023 | B2 * | 9/2008 | Allen et al. | 348/734 |
| 7,929,939 | B2 * | 4/2011 | Rofougaran et al. | 455/333 |
| 2007/0118856 | A1 * | 5/2007 | Lee | 725/52 |
| 2008/0005767 | A1 * | 1/2008 | Seo | 725/62 |

* cited by examiner

*Primary Examiner* — Sanh Phu
(74) *Attorney, Agent, or Firm* — Garlick & Markison; Bruce E. Garlick

(57) ABSTRACT

An RFIC includes an RF section, a memory interface, a display interface, an audio codec, a bus matrix, and a processing unit. The RF section converts a first inbound RF signal into a first inbound symbol stream and converts a second inbound RF signal into a second inbound symbol stream. The memory interface is operably coupled to retrieve a video file from memory and the display interface is operable to provide video data to a display. The audio codec converts an output digital signal into an output voice signal. The processing unit converts the first inbound symbol stream into streaming video data; converts the second inbound symbol stream into the output digital signal; and facilitates providing, via the bus matrix, at least one of: the video file to the display interface as the video data; the streaming video data to the display interface as the video data; and the digital output signal to the audio codec.

20 Claims, 10 Drawing Sheets

US 8,838,028 B2

MULTI-MODE CELLULAR IC FOR MULTI-MODE COMMUNICATIONS

CROSS REFERENCE TO RELATED APPLICATIONS

The present U.S. Utility patent application claims priority pursuant to 35 USC §120 as a continuing patent application of U.S. Utility patent application Ser. No. 12/056,493, entitled "MULTI-MODE CELLULAR IC MEMORY MANAGEMENT,", filed Mar. 27, 2008, which claims priority pursuant to 35 USC §119(e) to U.S. Provisional Patent Application Ser. No. 60/953,426, entitled "MULTI-MODE CELLULAR IC MEMORY MANAGEMENT,", filed Aug. 1, 2007, which is hereby incorporated herein by reference in its entirety and made part of the present U.S. Utility patent application for all purposes.

TECHNICAL FIELD OF THE INVENTION

The present invention relates generally to cellular wireless communication systems, and more particularly to integrated circuits of transceivers operating within such systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As the desire for wireless communication devices to support multiple standards continues, recent trends include the desire to integrate more functions on to a single chip. However, numerous functions increase the amount of power consumed by the IC. Thus, better methods of managing power consumption and system resources within a multiple function IC are desirable.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
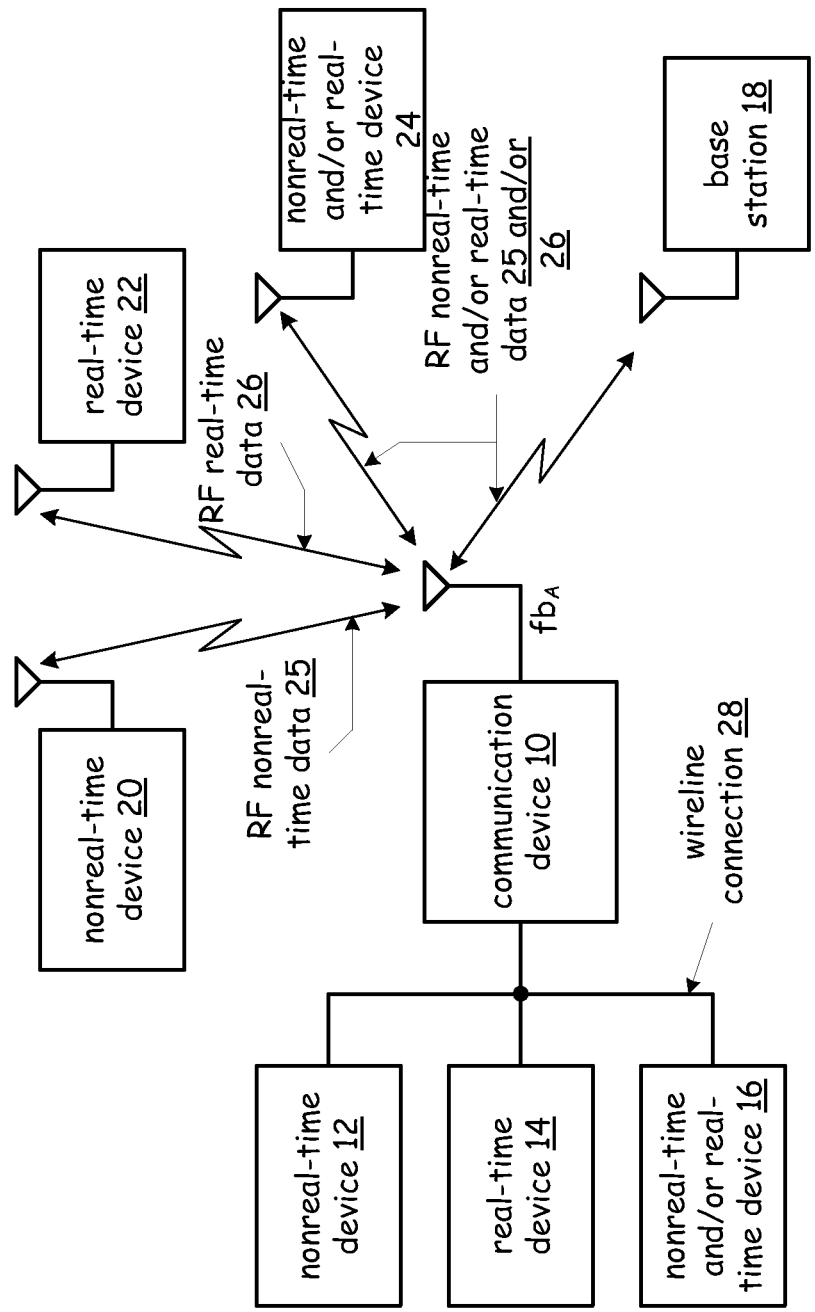
FIG. 1 is a schematic block diagram of a wireless communication environment in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11(g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 2:
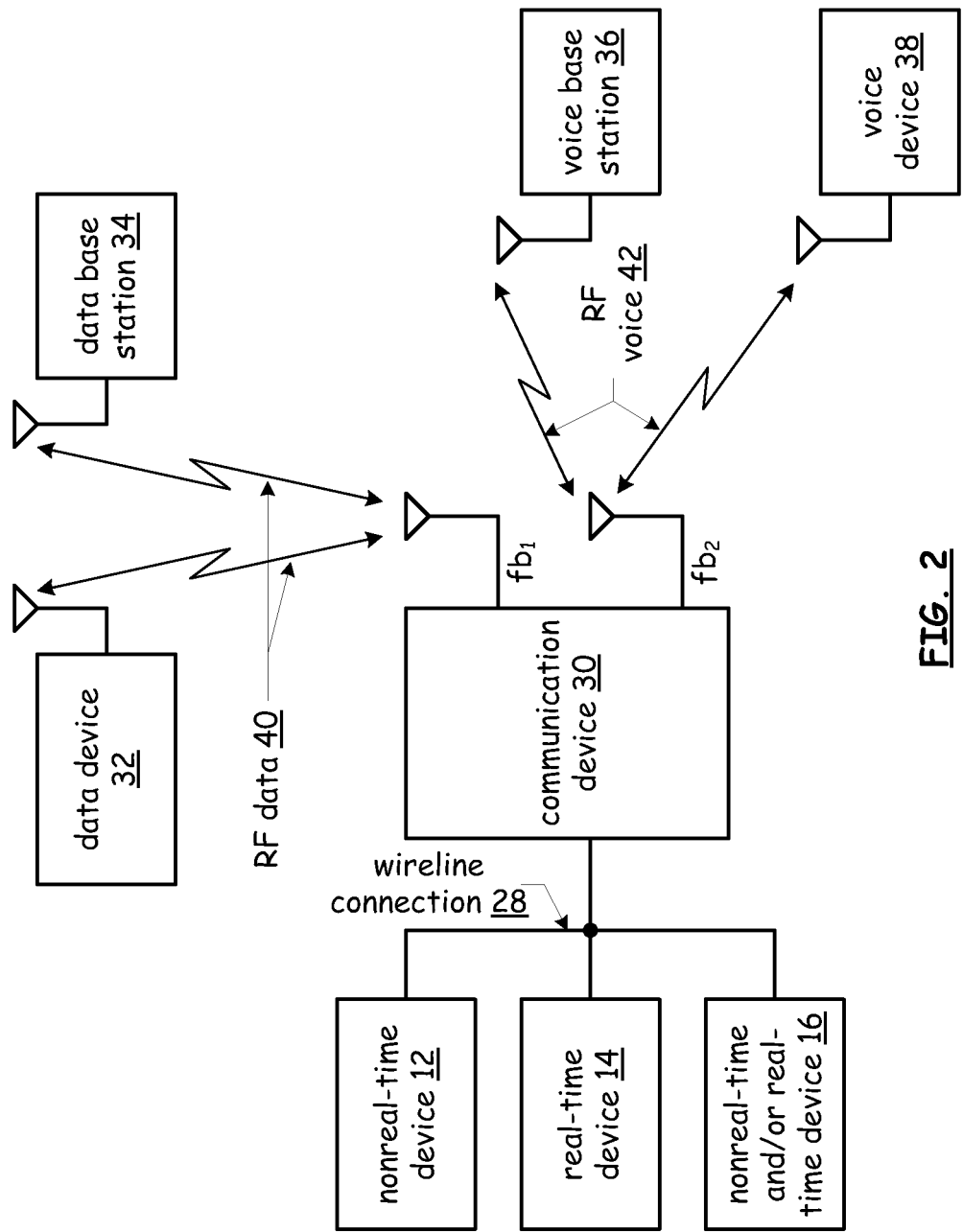
FIG. 2 is a schematic block diagram of another wireless communication environment in accordance with the present invention.

FIG. 2 is a schematic block diagram of another wireless communication environment that includes a communication device 30 communicating with one or more of the wireline non-real-time device 12, the wireline real-time device 14, the wireline non-real-time and/or real-time device 16, a wireless data device 32, a data base station 34, a voice base station 36, and a wireless voice device 38. The communication device 30, which may be a personal computer, laptop computer, personal entertainment device, cellular telephone, personal digital assistant, a game console, a game controller, and/or any other type of device that communicates data and/or voice signals, may be coupled to one or more of the wireline non-real-time device 12, the wireline real-time device 14, and the wireline non-real-time and/or real-time device 16 via the wireless connection 28. The communication device may include a multi function RF IC 50 provided by embodiments of the present invention. Overall performance of the communication device may be enhanced by having improved battery life through improved power management provided by the bus architecture of embodiments of the present invention. Performance may also be improved by directly coupling resources during certain modes of operation as allowed by the bus architecture of embodiments of the present invention.

The communication device 30 communicates RF data 40 with the data device 32 and/or the data base station 34 via one or more channels in a first frequency band ($fb_1$) that is designated for wireless communications. For example, the first frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries.

The communication device 30 communicates RF voice 42 with the voice device 38 and/or the voice base station 36 via one or more channels in a second frequency band ($fb_2$) that is designated for wireless communications. For example, the second frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. In a particular example, the first frequency band may be 900 MHz for EDGE data transmissions while the second frequency band may the 1900 MHz and 2100 MHz for WCDMA voice transmissions.

The voice device 38 and the voice base station 36 communicate voice signals that, if interrupted, would result in a noticeable adverse affect (e.g., a disruption in a communication). For example, the voice signals may include, but is not limited to, digitized voice signals, digitized audio data, and/or streaming video data. Note that the voice device 38 may be a personal computer, laptop computer, personal digital assistant, a cellular telephone, a game console, a wireless local area network (WLAN) transceiver, a Bluetooth transceiver, a frequency modulation (FM) tuner, a broadcast television tuner, a digital camcorder, and/or any other device that has a wireless interface for conveying voice signals with another device.

The data device 32 and the data base station 34 communicate data that, if interrupted, would not generally result in a noticeable adverse affect. For example, the data may include, but is not limited to, text messages, still video images, graphics, control data, emails, and/or web browsing. Note that the data device 32 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireless interface for conveying data with another device.

Depending on the devices coupled to the communication unit 30, the communication unit 30 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 3:
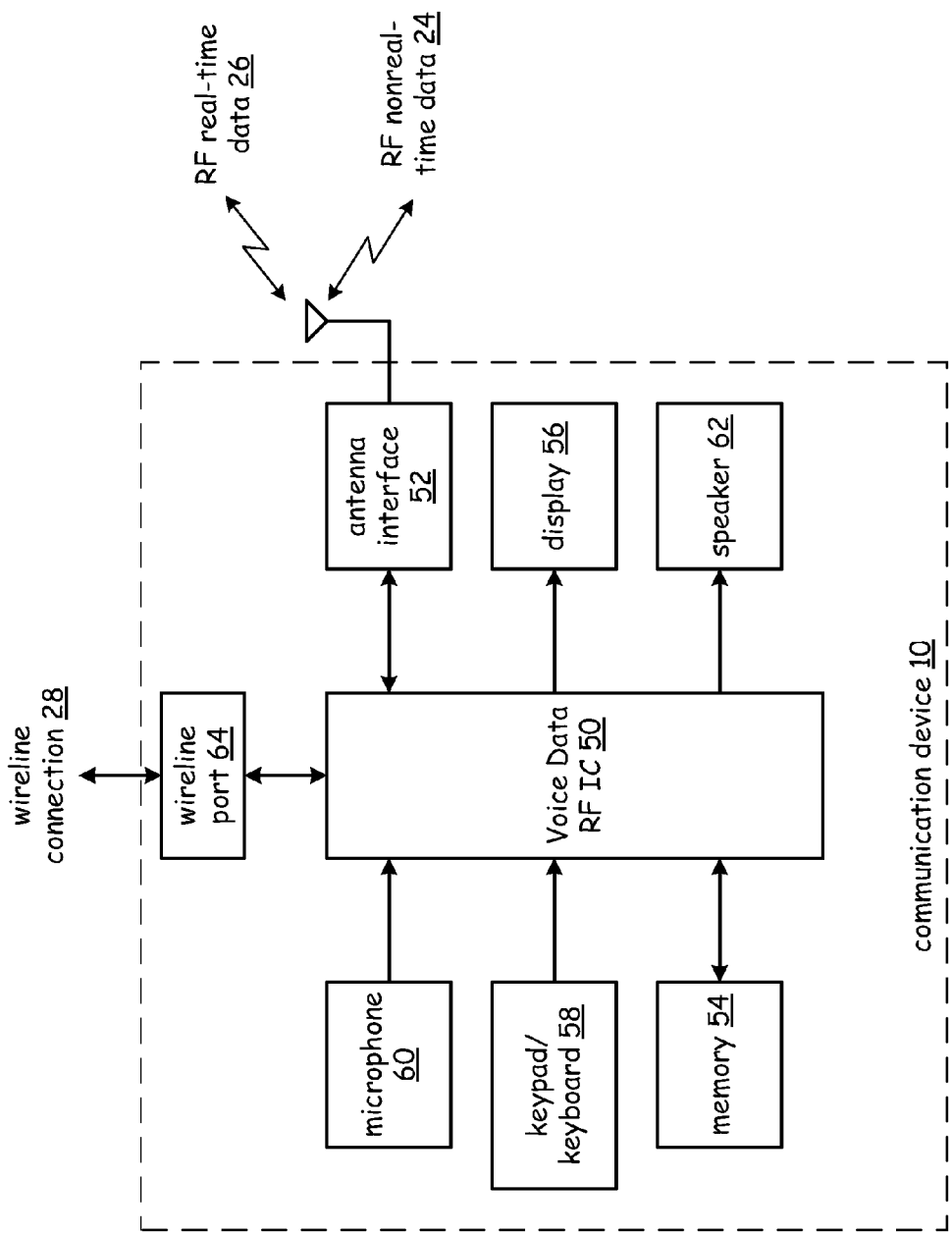
FIG. 3 is a schematic block diagram of an embodiment of a communication device in accordance with the present invention.

FIG. 3 is a schematic block diagram of an embodiment of a communication device 10 that includes a Voice Data RF (radio frequency) IC (integrated circuit) 50, an antenna interface 52, memory 54, a display 56, a keypad and/or key board 58, at least one microphone 60, at least one speaker 62, and a wireline port 64. The memory 54 may be NAND flash, NOR flash, SDRAM, and/or SRAM for storing data and/or instructions to facilitate communications of real-time and non-real-time data via the wireline port 64 and/or via the antenna interface 52. In addition, or in the alternative, the memory 54 may store video files, audio files, and/or image files for subsequent wireline or wireless transmission, for subsequent display, for file transfer, and/or for subsequent editing. Accordingly, when the communication device supports storing, displaying, transferring, and/or editing of audio, video, and/or image files, the memory 54 would further store algorithms to support such storing, displaying, and/or editing. For example, they may include, but are not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 60 receives an audible voice signal, amplifies it, and provide the amplified voice signal to the Voice Data RF IC 50. The Voice Data RF IC 50 processes the amplified voice signal into a digitized voice signal using one or more audio processing schemes (e.g., pulse code modulation, audio compression, etc.). The Voice Data RF IC 50 may transmit the digitized voice signal via the wireless port 64 to the wireline real-time device 14 and/or to the wireline non-real-time and/or real-time device 16. In addition to, or in the alternative, the Voice Data RF IC 50 may transmit the digitized voice signal as RF real-time data 26 to the wireless real-time device 22, and/or to the wireless non-real-time and/or real-time device 24 via the antenna interface 52. Voice Data RF IC 50 may be a multi function IC as provided by embodiments of the present invention. Overall performance of the communication device may be enhanced by having improved battery life through improved power management provided by the bus architecture of embodiments of the present invention. Performance may also be improved by directly coupling resources during certain modes of operation as allowed by the bus architecture of embodiments of the present invention.

For outgoing real-time audio and/or video communications, the Voice Data RF IC 50 retrieves an audio and/or video file from the memory 54. The Voice Data RF IC 50 may decompress the retrieved audio and/or video file into digitized streaming audio and/or video. The Voice Data RF IC 50 may transmit the digitized streaming audio and/or video via the wireless port 64 to the wireline real-time device 14 and/or to the wireline non-real-time and/or real-time device 16. In addition to, or in the alternative, the Voice Data RF IC 50 may transmit the digitized streaming audio and/or video as RF real-time data 26 to the wireless real-time device 22, and/or to the wireless non-real-time and/or real-time device 24 via the antenna interface 52. Note that the Voice Data RF IC 50 may mix a digitized voice signal with a digitized streaming audio and/or video to produce a mixed digitized signal that may be transmitted via the wireline port 64 and/or via the antenna interface 52.

In a playback mode of the communication device 10, the Voice Data RF IC 50 retrieves an audio and/or video file from the memory 54. The Voice Data RF IC 50 may decompress the retrieved audio and/or video file into digitized streaming audio and/or video. The Voice Data RF IC 50 may convert an audio portion of the digitized streaming audio and/or video into analog audio signals that are provided to the at least one speaker 62. In addition, the Voice Data RF IC 50 may convert a video portion of the digitized streaming audio and/or video into analog or digital video signals that are provided to the display 56, which may be a liquid crystal (LCD) display, a plasma display, a digital light project (DLP) display, and/or any other type of portable video display.

For incoming RF voice communications, the antenna interface 52 receives, via an antenna, inbound RF real-time data 26 (e.g., inbound RF voice signals) and provides them to the Voice Data RF IC 50. The Voice Data RF IC 50 processes the inbound RF voice signals into digitized voice signals. The Voice Data RF IC 50 may transmit the digitized voice signals via the wireless port 64 to the wireline real-time device 14 and/or to the wireline non-real-time and/or real-time device 16. In addition to, or in the alternative, the Voice Data RF IC 50 may convert the digitized voice signals into an analog voice signals and provide the analog voice signals to the speaker 62.

The Voice Data RF IC 50 may receive digitized voice-audio-&/or-video signals from the wireline connection 28 via the wireless port 64 or may receive RF signals via the antenna interface 52, where the Voice Data RF IC 50 recovers the digitized voice-audio-&/or-video signals from the RF signals. The Voice Data RF IC 50 may then compress the received digitized voice-audio-&/or-video signals to produce voice-audio-&/or-video files and store the files in memory 54. In the alternative, or in addition to, the Voice Data RF IC 50 may convert the digitized voice-audio-&/or-video signals into analog voice-audio-&/or-video signals and provide them to the speaker 62 and/or display.

For outgoing non-real-time data communications, the keypad/keyboard 58 (which may be a keypad, keyboard, touch screen, voice activated data input, and/or any other mechanism for inputted data) provides inputted data (e.g., emails, text messages, web browsing commands, etc.) to the Voice Data RF IC 50. The Voice Data RF IC 50 converts the inputted data into a data symbol stream using one or more data modulation schemes (e.g., QPSK, 8-PSK, etc.). The Voice Data RF IC 50 converts the data symbol stream into RF non-real-time data signals 24 that are provided to the antenna interface 52 for subsequent transmission via the antenna. In addition to, or in the alternative, the Voice Data RF IC 50 may provide the inputted data to the display 56. As another alternative, the Voice Data RF IC 50 may provide the inputted data to the wireline port 64 for transmission to the wireline non-real-time data device 12 and/or the non-real-time and/or real-time device 16.

For incoming non-real-time communications (e.g., text messaging, image transfer, emails, web browsing), the antenna interface 52 receives, via an antenna, inbound RF non-real-time data signals 24 (e.g., inbound RF data signals) and provides them to the Voice Data RF IC 50. The Voice Data RF IC 50 processes the inbound RF data signals into data signals. The Voice Data RF IC 50 may transmit the data signals via the wireless port 64 to the wireline non-real-time device 12 and/or to the wireline non-real-time and/or real-time device 16. In addition to, or in the alternative, the Voice Data RF IC 50 may convert the data signals into analog data signals and provide the analog data signals to an analog input of the display 56 or the Voice Data RF IC 50 may provide the data signals to a digital input of the display 56.

Figure 4:
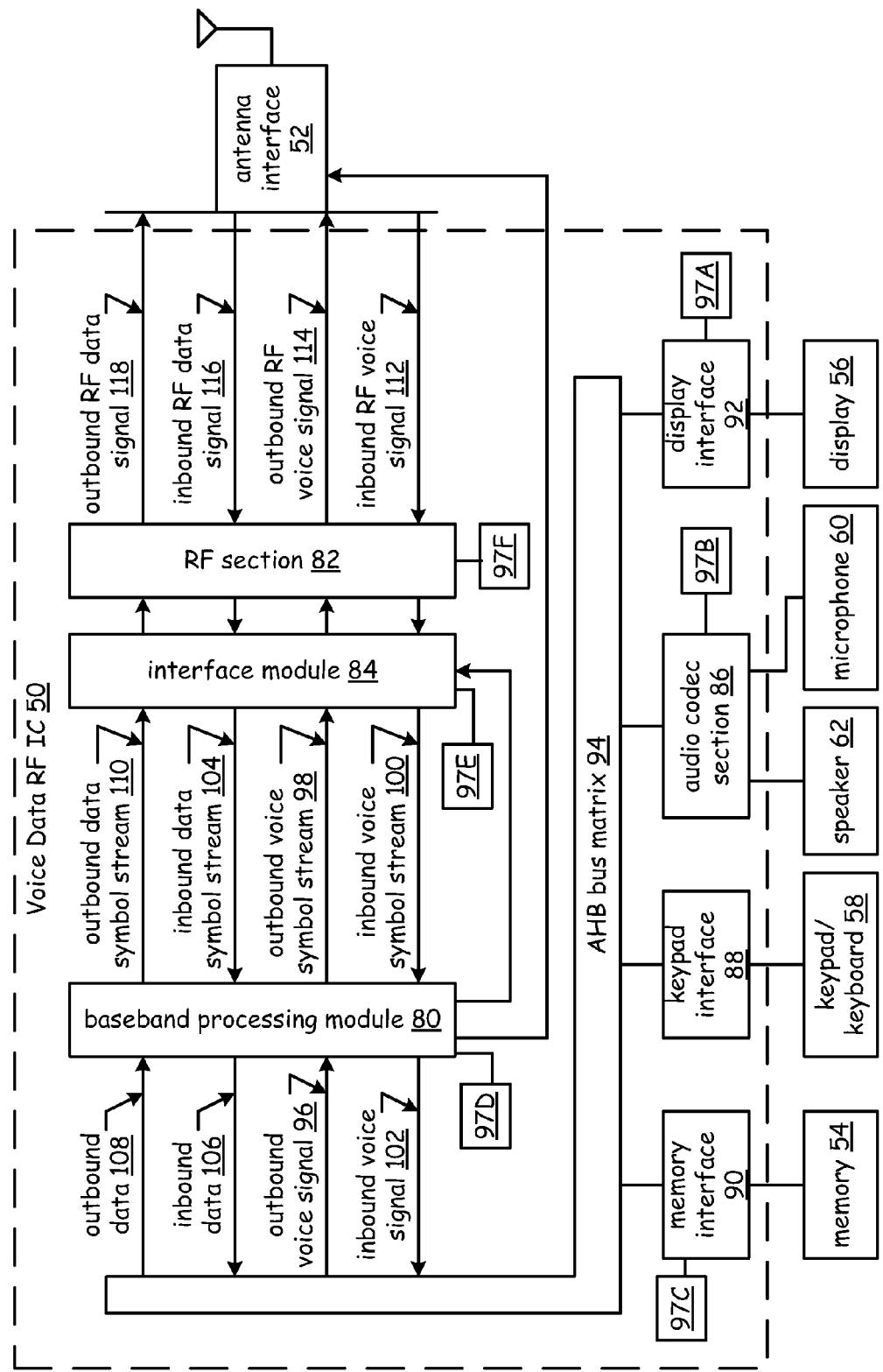
FIG. 4 is a schematic block diagram of another embodiment of a communication device in accordance with the present invention.

FIG. 4 is a schematic block diagram of another embodiment of a communication device 10 that includes the Voice Data RF IC 50, the antenna interface 52, the memory 54, the keypad/keyboard 58, the at least one speaker 62, the at least one microphone 60, and the display 56. The Voice Data RF IC 50 includes a baseband processing module 80, a radio frequency (RF) section 82, an interface module 84, an audio codec 86, a keypad interface 88, a memory interface 90, a display interface 92, an advanced high-performance (AHB) bus matrix 94, and power islands 97A-97F. The baseband processing module 80 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 80 may have an associated memory and/or memory element, which may be a single memory device, a plurality of memory devices, and/or embedded circuitry of the processing module 80. Such a memory device may be a read-only memory, random access memory, volatile memory, non-volatile memory, static memory, dynamic memory, flash memory, cache memory, and/or any device that stores digital information. Note that when the processing module 80 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 80 executes, hard coded and/or operational instructions corresponding to at least some of the steps and/or functions illustrated in the FIGs.

The baseband processing module 80 converts an outbound voice signal 96 into an outbound voice symbol stream 98 in accordance with one or more existing wireless communication standards, new wireless communication standards, modifications thereof, and/or extensions thereof (e.g., GSM, AMPS, digital AMPS, CDMA, etc.). The baseband processing module 80 may perform one or more of scrambling, encoding, constellation mapping, modulation, frequency spreading, frequency hopping, beam forming, space-time-block encoding, space-frequency-block encoding, and/or digital baseband to IF conversion to convert the outbound voice signal 96 into the outbound voice symbol stream 98. Depending on the desired formatting of the outbound voice symbol stream 98, the baseband processing module 80 may generate the outbound voice symbol stream 98 as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, and co-pending patent application entitled PROGRAMMABLE HYBRID TRANSMITTER, having a filing date of Jul. 26, 2006, and an application Ser. No. 11/494,682.

The interface module 84 conveys the outbound voice symbol stream 98 to the RF section 82 when the Voice Data RF IC 50 is in a voice mode. The voice mode may be activated by the user of the communication device 10 by initiating a cellular telephone call, by receiving a cellular telephone call, by initiating a walkie-talkie type call, by receiving a walkie-talkie type call, by initiating a voice record function, and/or by another voice activation selection mechanism.

The RF section 82 converts the outbound voice symbol stream 98 into an outbound RF voice signal 114 in accordance with the one or more existing wireless communication standards, new wireless communication standards, modifications thereof, and/or extensions thereof (e.g., GSM, AMPS, digital AMPS, CDMA, etc.). In one embodiment, the RF section 82 receives the outbound voice symbol stream 98 as Cartesian coordinates. In this embodiment, the RF section 82 mixes the in-phase components of the outbound voice symbol stream 98 with an in-phase local oscillation to produce a first mixed signal and mixes the quadrature components of the outbound voice symbol stream 98 to produce a second mixed signal. The RF section 82 combines the first and second mixed signals to produce an up-converted voice signal. The RF section 82 then amplifies the up-converted voice signal to produce the outbound RF voice signal 114, which it provides to the antenna interface 52. Note that further power amplification may occur between the output of the RF section 82 and the input of the antenna interface 52.

For incoming voice signals, the RF section 82 receives an inbound RF voice signal 112 via the antenna interface 52. The RF section 82 converts the inbound RF voice signal 112 into an inbound voice symbol stream 100. In one embodiment, the RF section 82 extracts Cartesian coordinates from the inbound RF voice signal 112 to produce the inbound voice symbol stream 100. In another embodiment, the RF section 82 extracts Polar coordinates from the inbound RF voice signal 112 to produce the inbound voice symbol stream 100. In yet another embodiment, the RF section 82 extracts hybrid coordinates from the inbound RF voice signal 112 to produce the inbound voice symbol stream 100. The interface module 84 provides the inbound voice symbol stream 100 to the baseband processing module 80 when the Voice Data RF IC 50 is in the voice mode.

The baseband processing module 80 converts the inbound voice symbol stream 100 into an inbound voice signal 102. The baseband processing module 80 may perform one or more of descrambling, decoding, constellation demapping, modulation, frequency spreading decoding, frequency hopping decoding, beam forming decoding, space-time-block decoding, space-frequency-block decoding, and/or IF to digital baseband conversion to convert the inbound voice symbol stream 100 into the inbound voice signal 102, which is placed on the AHB bus matrix 94.

In one embodiment, the outbound voice signal 96 is received from the audio codec section 86 via the AHB bus 94. The audio codec section 86 is coupled to the at least one microphone 60 to receive an analog voice input signal there from. The audio codec section 86 converts the analog voice input signal into a digitized voice signal that is provided to the baseband processing module 80 as the outbound voice signal 96. The audio codec section 86 may perform an analog to digital conversion to produce the digitized voice signal from the analog voice input signal, may perform pulse code modulation (PCM) to produce the digitized voice signal, and/or may compress a digital representation of the analog voice input signal to produce the digitized voice signal.

The audio codec section 86 is also coupled to the at least one speaker 62. In one embodiment the audio codec section 86 processes the inbound voice signal 102 to produce an analog inbound voice signal that is subsequently provided to the at least one speaker 62. The audio codec section 86 may process the inbound voice signal 102 by performing a digital to analog conversion, by PCM decoding, and/or by decompressing the inbound voice signal 102.

For an outgoing data communication (e.g., email, text message, web browsing, and/or non-real-time data), the baseband processing module 80 receives outbound data 108 from the keypad interface 88 and/or the memory interface 90. The baseband processing module 80 converts outbound data 108 into an outbound data symbol stream 110 in accordance with one or more existing wireless communication standards, new wireless communication standards, modifications thereof, and/or extensions thereof (e.g., EDGE, GPRS, etc.). The baseband processing module 80 may perform one or more of scrambling, encoding, constellation mapping, modulation, frequency spreading, frequency hopping, beam forming, space-time-block encoding, space-frequency-block encoding, and/or digital baseband to IF conversion to convert the outbound data 108 into the outbound data symbol stream 110. Depending on the desired formatting of the outbound data symbol stream 110, the baseband processing module 80 may generate the outbound data symbol stream 110 as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, and co-pending patent application entitled PROGRAMMABLE HYBRID TRANSMITTER, having a filing date of Jul. 26, 2006, and an application Ser. No. 11/494,682. In addition to, or in the alternative of, the outbound data 108 may be provided to the display interface 92 such that the outbound data 108, or a representation thereof, may be displayed on the display 56.

The interface module 84 conveys the outbound data symbol stream 110 to the RF section 82 when the Voice Data RF IC 50 is in a data mode. The data mode may be activated by the user of the communication device 10 by initiating a text message, by receiving a text message, by initiating a web browser function, by receiving a web browser response, by initiating a data file transfer, and/or by another data activation selection mechanism.

The RF section 82 converts the outbound data symbol stream 110 into an outbound RF data signal 118 in accordance with the one or more existing wireless communication standards, new wireless communication standards, modifications thereof, and/or extensions thereof (e.g., EDGE, GPRS, etc.). The RF section 82 combines the first and second mixed signals to produce an up-converted data signal. The RF section 82 then amplifies the up-converted data signal to produce the outbound RF data signal 118, which it provides to the antenna interface 52. Note that further power amplification may occur between the output of the RF section 82 and the input of the antenna interface 52

For incoming data communications, the RF section 82 receives an inbound RF data signal 116 via the antenna interface 52. The RF section 82 converts the inbound RF data signal 116 into an inbound data symbol stream 104.

The baseband processing module 80 converts the inbound data symbol stream 104 into inbound data 106. The baseband processing module 80 may perform one or more of descrambling, decoding, constellation demapping, modulation, frequency spreading decoding, frequency hopping decoding, beam forming decoding, space-time-block decoding, space-frequency-block decoding, and/or IF to digital baseband conversion to convert the inbound data symbol stream 104 into the inbound data 106, which is placed on the AHB bus matrix 94.

In one embodiment, the display interface 92 retrieves the inbound data 106 from the AHB bus matrix 94 and provides it, or a representation thereof, to the display 56. In another embodiment, the memory interface 90 retrieves the inbound data 106 from the AHG bus matrix 94 and provides it to the memory 54 for storage therein.

Power islands 97A-97F may be associated with a particular function of the IC. For example, the display interface may be on a separate power island 97A such that when the video or graphics processing is not required, the display interface 92 does not receive power. Similarly, audio codec section 86 may be on a separate power island 97B such that when the audio processing is not required, the audio codec section 86 does not receive power. The power islands 97A-97F may be turned off by removing Vdd and/or by disabling a clock for the particular function. Power islands may not be required to be fully disabled, but placed into a sleep mode, where Vdd is lowered and/or the clock rate is lowered. For example, in a GSM sleep mode, a low frequency crystal oscillator (e.g., 36 KHz) may be used to generate the clocking for the GSM transceiver. In this mode, a high frequency oscillator (e.g., 24 MHz) is occasionally enabled to calibrate the lower frequency oscillator. Lower frequency oscillator consumes less power but is less accurate than the higher frequency clock. Note that when the high frequency oscillator is enabled for operations other than calibrating the low frequency oscillator, the lower frequency oscillator may be disabled.

Figure 5:
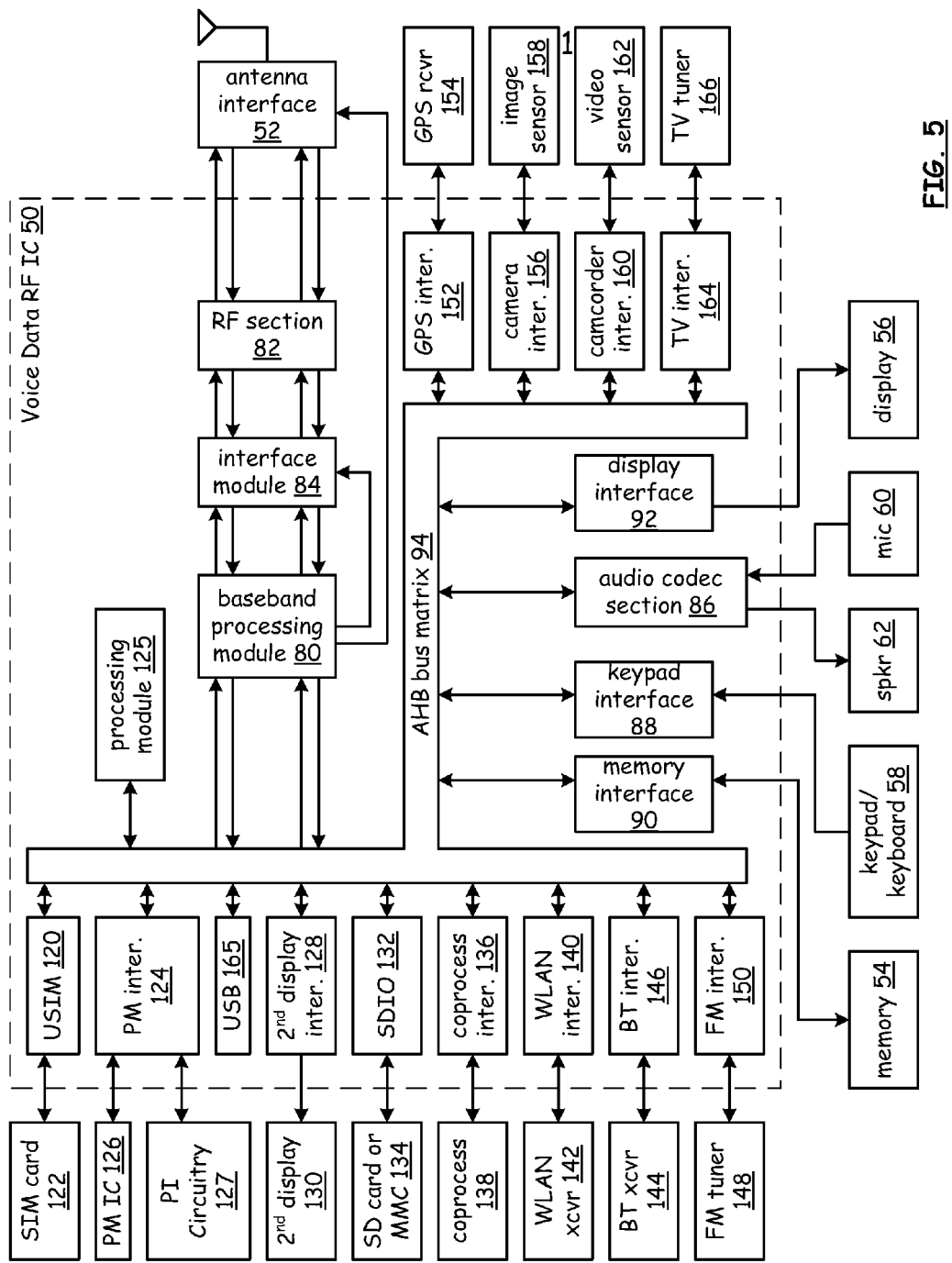
FIG. 5 is a schematic block diagram of another embodiment of a communication device in accordance with the present invention.

FIG. 5 is a schematic block diagram of another embodiment of a communication device 10 that includes the Voice Data RF IC 50, the antenna interface 52, the memory 54, the keypad/keyboard 58, the at least one speaker 62, the at least one microphone 60, the display 56, and at least one of: a SIM (Security Identification Module) card 122, a power management (PM) IC 126, a second display 130, a SD (Secure Digital) card or MMC (Multi Media Card) 134, a coprocessor IC 138, a WLAN transceiver 142, a Bluetooth (BT) transceiver 144, an FM tuner 148, a GPS receiver 154, an image sensor 158 (e.g., a digital camera), a video sensor 162 (e.g., a camcorder), and a TV tuner 166. The Voice Data RF IC 50 includes the baseband processing module 80, the RF section 82, the interface module 84, the audio codec 86, the keypad interface 88, the memory interface 90, the display interface 92, the advanced high-performance (AHB) bus matrix 94, a processing module 125, and one or more of: a universal subscriber identity module (USIM) interface 120, power management (PM) interface 124, a second display interface 128, a secure digital input/output (SDIO) interface 132, a coprocessor interface 136, a WLAN interface 140, a Bluetooth interface 146, an FM interface 150, a GPS interface 152, a camera interface 156, a camcorder interface 160, a TV interface 164, and a Universal Serial Bus (USB) interface 165. While not shown, the Voice Data RF IC 50 may further included one or more of a Universal Asynchronous Receiver-Transmitter (UART) interface coupled to the AHB bus matrix 94, a Serial Peripheral Interface (SPI) interface coupled to the AHB bus matrix 94, an I2S interface coupled to the AHB bus matrix 94, and a pulse code modulation (PCM) interface coupled to the AHB bus matrix 94.

The processing module 125 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 125 may have an associated memory and/or memory element, which may be a single memory device, a plurality of memory devices, and/or embedded circuitry of the processing module 125. Such a memory device may be a read-only memory, random access memory, volatile memory, non-volatile memory, static memory, dynamic memory, flash memory, cache memory, and/or any device that stores digital information. Note that when the processing module 125 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 125 executes, hard coded and/or operational instructions corresponding to at least some of the steps and/or functions illustrated in the FIGs.

In this embodiment, the Voice Data RF IC 50 includes one or more of a plurality of interfaces that enable the communication device 10 to include one or more of a plurality of additional circuits. For example, the communication device 10 may be a cellular telephone that provides voice, data, and at least one other service via the Voice Data RF IC 50, which, in this instance, is a cellular telephone IC. An example of another service includes WLAN access via a WLAN transceiver to support voice over IP communications, internet access, etc. Another service example includes Bluetooth access via a Bluetooth transceiver to support a Bluetooth wireless headset, file transfers, and other piconet services.

These additional circuits may not require power at all times. To reduce power consumption and extend battery life, power islands may be used to supply power to these additional circuits only when needed. The power management interface 124 may be used to direct power to these additional circuits as required through the bus matrix. The power islands associated with the additional circuits may be turned off by removing Vdd and/or by disabling a clock for the particular function. Power islands may not be required to be fully disabled, but placed into a sleep mode, where Vdd is lowered and/or the clock rate is lowered. For example, in a GSM sleep mode, a low frequency crystal oscillator (e.g., 36 KHz) may be used to generate the clocking for the GSM transceiver. In this mode, a high frequency oscillator (e.g., 24 MHz) is occasionally enabled to calibrate the lower frequency oscillator. Lower frequency oscillator consumes less power but is less accurate than the higher frequency clock. Note that when the high frequency oscillator is enabled for operations other than calibrating the low frequency oscillator, the lower frequency oscillator may be disabled.

For wireline connectivity to another device, the Voice Data RF IC 50 may include a USB interface 165, an SPI interface, and I2S interface, and/or another other type of wired interface. In this instance, file transfers are easily supported by the wireline connectivity and can be managed by the processing module 125. Further, video games may be downloaded to the communication device 10 via the wireline connectivity and subsequently played as administered by the processing module 125. Alternatively, the wireline connectivity provides coupling to a game console such that the communication device 10 acts as the display and/or controller of the video game.

With the various interface options of the Voice Data RF IC 50, the communication device 10 may function as a personal entertainment device to playback audio files, video files, image files, to record images, to record video, to record audio, to watch television, to track location, to listen to broadcast FM radio, etc. Such personal entertainment functions would be administered primarily by the processing module 125.

With the inclusion of one or more display interfaces 92 and 128, the communication device may include multiple displays 56 and 130. The displays 56 and 130 may be a liquid crystal (LCD) display, a plasma display, a digital light project (DLP) display, and/or any other type of portable video display. Note that the display interfaces 92 and 128 may be an LCD interface, a mobile industry processor interface (MIPI), and/or other type of interface for supporting the particular display 56 or 130.

The Voice Data RF IC 50 includes security interface options to protect the data stored in the communication device and/or to insure use of the communication device is by an authorized user. For example, the Voice Data RF IC 50 may include the USIM interface 120 and/or the SDIO interface 132 for interfacing with a SIM card, a Secure Data card and/or a multi media card.

Of the various interfaces that may be included on the Voice Data RF IC 50, I2S is an industry standard 3-wire interface for streaming stereo audio between devices and the PCM interface is a serial interface used to transfer speech data. Of the external components of the communication device 10 with respect to the IC 50, a Secure Digital (SD) is a flash memory (non-volatile) memory card format used in portable devices, including digital cameras and handheld computers. SD cards are based on the older Multi-Media-Card (MMC) format, but most are physically slightly thicker than MMC cards. A (SIM) card that stores user subscriber information, authentication information and provides storage space for text messages and USIM stores a long-term preshared secret key K, which is shared with the Authentication Center (AuC) in the network. The USIM also verifies a sequence number that must be within a range using a window mechanism to avoid replay attacks, and is in charge of generating the session keys CK and IK to be used in the confidentiality and integrity algorithms of the KASUMI block cipher in UMTS.

Figure 6:
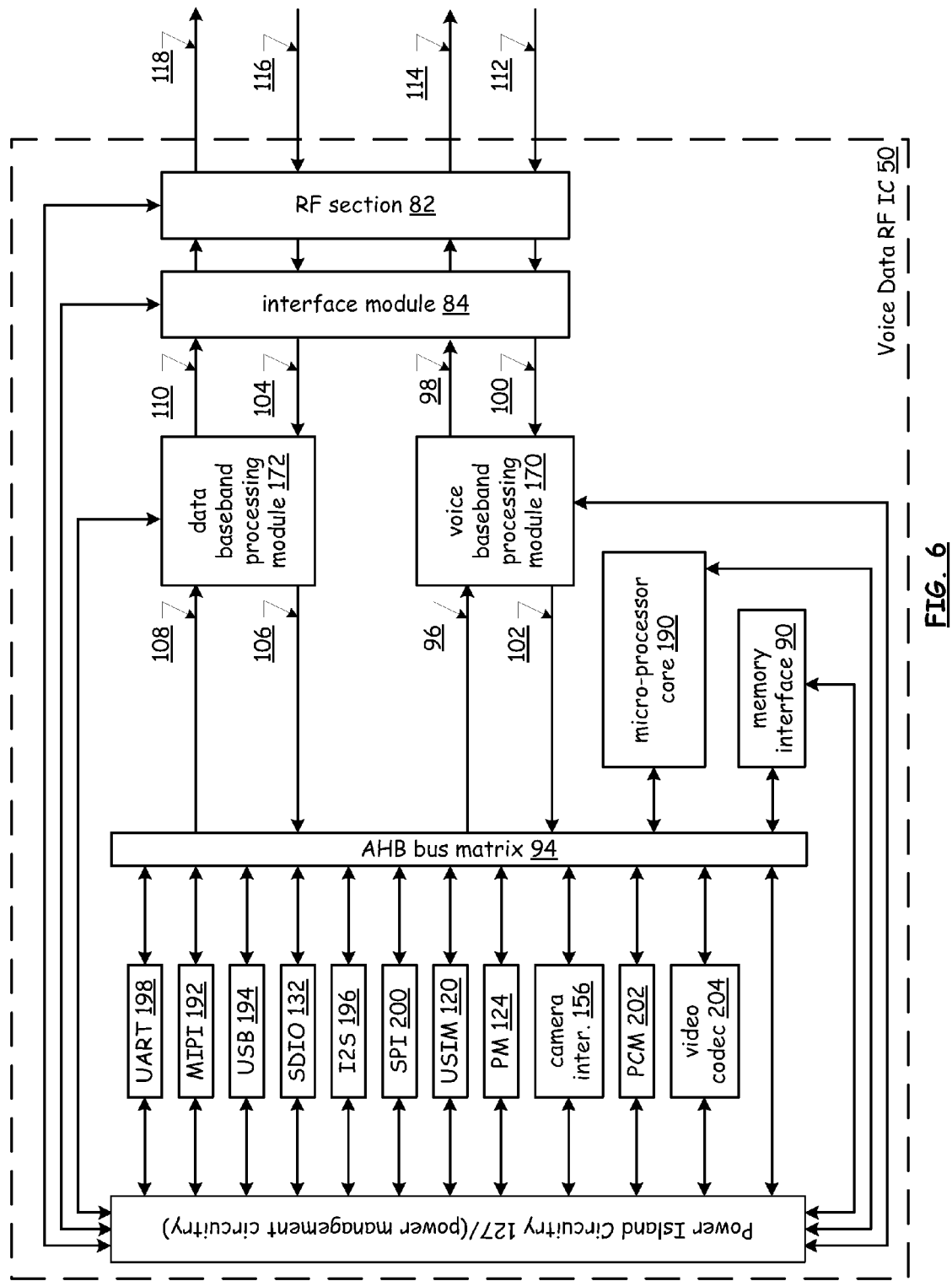
FIG. 6 is a schematic block diagram of an embodiment of a Voice Data RF IC in accordance with the present invention.

Voice data RF IC 50 as shown in FIG. 6 includes power island circuitry 127 which may take the form of a power bus matrix that provides power to specific functions such as various interfaces, UART198, MIPI192, USB194, SDIO132, I2S196, SPI200, USIM120, PM124, camera interface 156, PCM202 video Kodak 204, as well as data base band processing module 172, voice base band processing module 170, microprocessor core 190, memory interface 90, RF Section 82 and interface module 84. There may be specific times when any or all of these functions may not be required and embodiments of the present invention are a power island circuitry 127 in the form of a power bus to individually remove power from those modules or functions not requiring power in order to extend the battery life associated with a communication device 10 having voice data RF IC 50 and thus, enhance the overall performance of the communication device.

FIG. 6 is a schematic block diagram of another embodiment of the RFIC 50 that includes the RF section 82, the interface module 84, the AHB bus matrix 94, the power island circuitry 127, a data baseband processing module 172, a voice baseband processing module 170, a processor core 190, memory interface 90, and a plurality of interface modules 120, 124, 132, 156, and 192-204. The interface modules may include one or more of a UART, MIPI, USB, SDIO, I2S, SPI, USIM, PM, camera, PCM, and video codec interface.

In this embodiment, the power island circuitry 127 includes a plurality of controllable, or gateable, power lines and/or clock lines to each of the various modules of RFIC 50. In this instance, each of the modules may be individually controlled with respect to power to reduce the overall power consumption of the RFIC 50. For example, the power island circuitry 127 may include one or more power supplies (e.g., DC to DC converters, linear regulators, etc.) to generate one or more power supply voltages. In addition, the power island circuitry 127 may include one or more clock circuits (e.g., crystal oscillator, phase locked loop, counter, frequency divider, frequency multiplier, etc.) to generate one or more clock signals. In this example, for a given module 82, 84, 90, 107, 172, 190, 120, 124, 132, 156, and 192-204, the power island circuitry 127 may disable a power line coupled to the module (e.g., open a transistor to remove power from the module); may lower the power supply voltage; may disable a clock signal; and/or may lower the rate of a clock signal.

The decision of how and when to adjust power and/or a clock signal to a module may be done a priori based on known operating states of the device. For example, in a first mode, the data baseband processing module 172 may not be used this is disabled; in a second mode, the data baseband processing module 172 is not be used, but is put into a sleep mode; etc. This information may be stored in look up table and accessed when the device changes modes of operation. Alternatively, the decision of how and when to adjust the power and/or a clock signal may be automatically by determining at a given time, the status of use of the various modules. Based on the status of use, the power and/or clock signals are adjusted and/or disabled for a given module.

Figure 7:
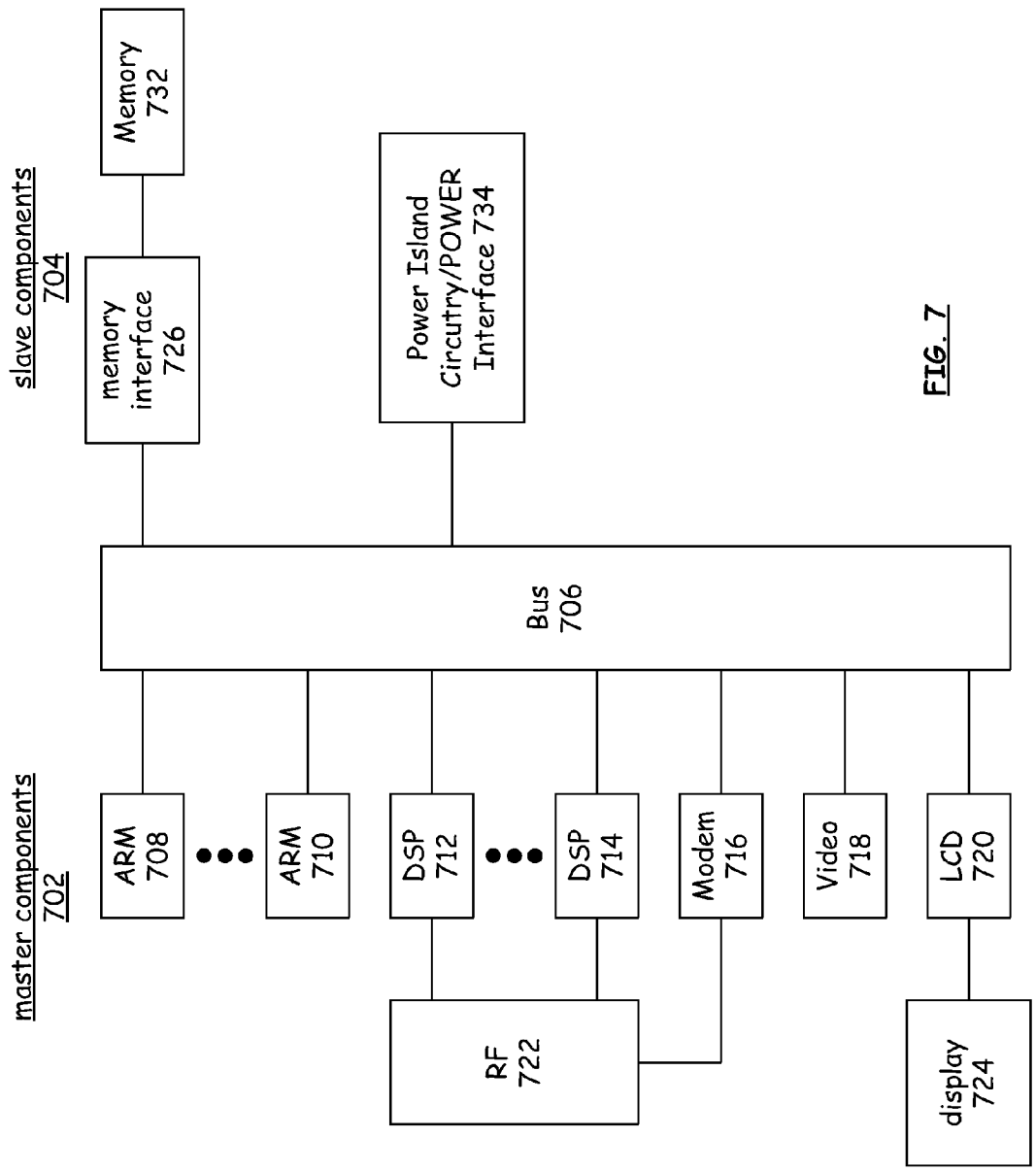
FIG. 7 is a schematic block diagram of another embodiment of an RFIC in accordance with the present invention.

FIG. 7 provides a schematic block diagram of voice data RF IC 700 that includes Master Components 702 and Slave Components 704 where all the components may be coupled to an AHB Bus 706. Master Components 702 include various ARMs, 708 through 710 as well a multiple DSPs shown as DSP 712 and DSP 714. Other components may include Modem 716, Video Processing Module 718, LCD Module 720 operably coupled to Display 724 and RF Processing Module 722. Slave Components 704 may include interfaces to resources such as Memory Interface 726 to Memory 732 or power interface/power island circuitry 734 to provide power islands that route power to specific components such as various Master Components 702 or Slave Components 704. Power island circuitry 734 and power interface 734 may direct power to only those components that are required in order to improve overall performance and power management of the IC.

Figure 8:
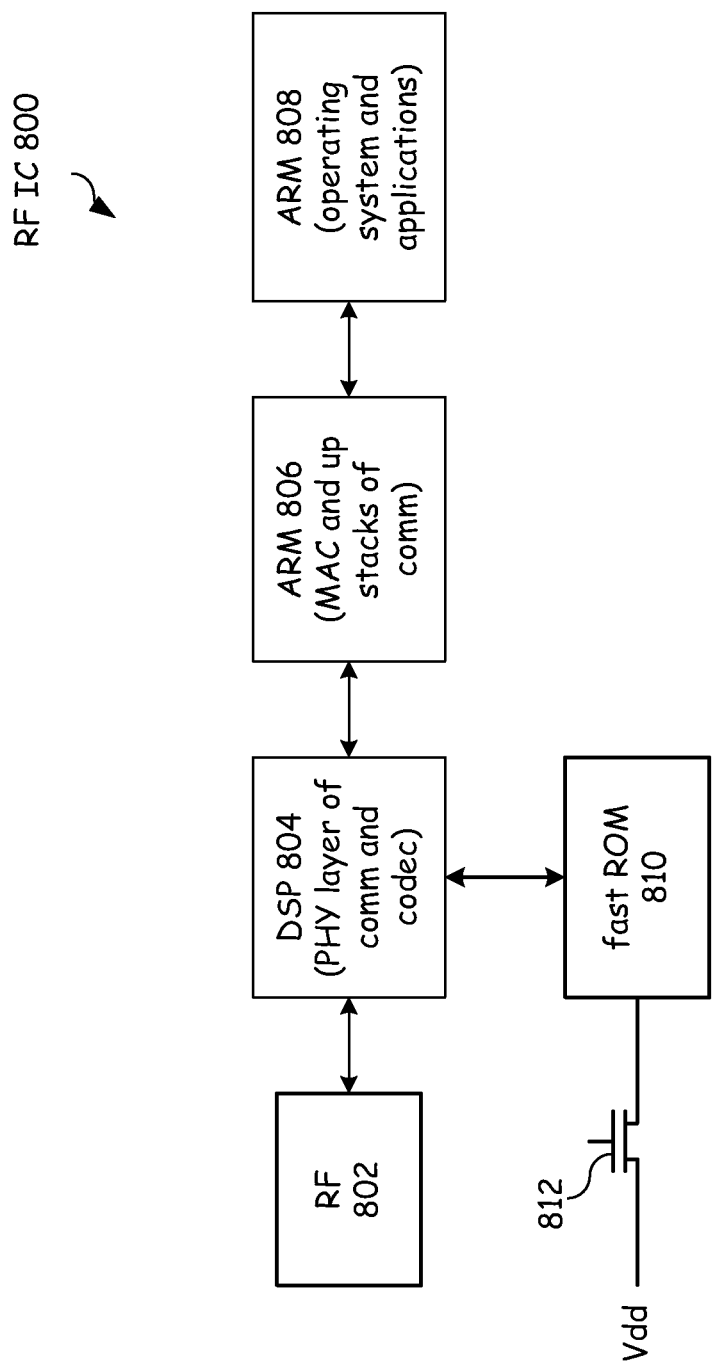
FIG. 8 is a schematic block diagram of another embodiment of an RFIC in accordance with the present invention.

FIG. 8 is a schematic block diagram of an embodiment of an RF IC 800 that includes RF processing module 802, DSP module 804, ARM 806, ARM 808, and ROM 810. In this example ROM 810 is not always required by DSP 804. Therefore power islands may be utilized to withdraw power to ROM 810 to conserve internal resources. This may be done by adjusting the voltage VDD or using a switch (i.e. transistor 812) to remove power from ROM 810 when not required. Power provided by the power islands may be turned off by removing Vdd and/or by disabling a clock for the particular function. Power islands may not be required to be fully disabled, but placed into a sleep mode, where Vdd is lowered and/or the clock rate is lowered.

Figure 9:
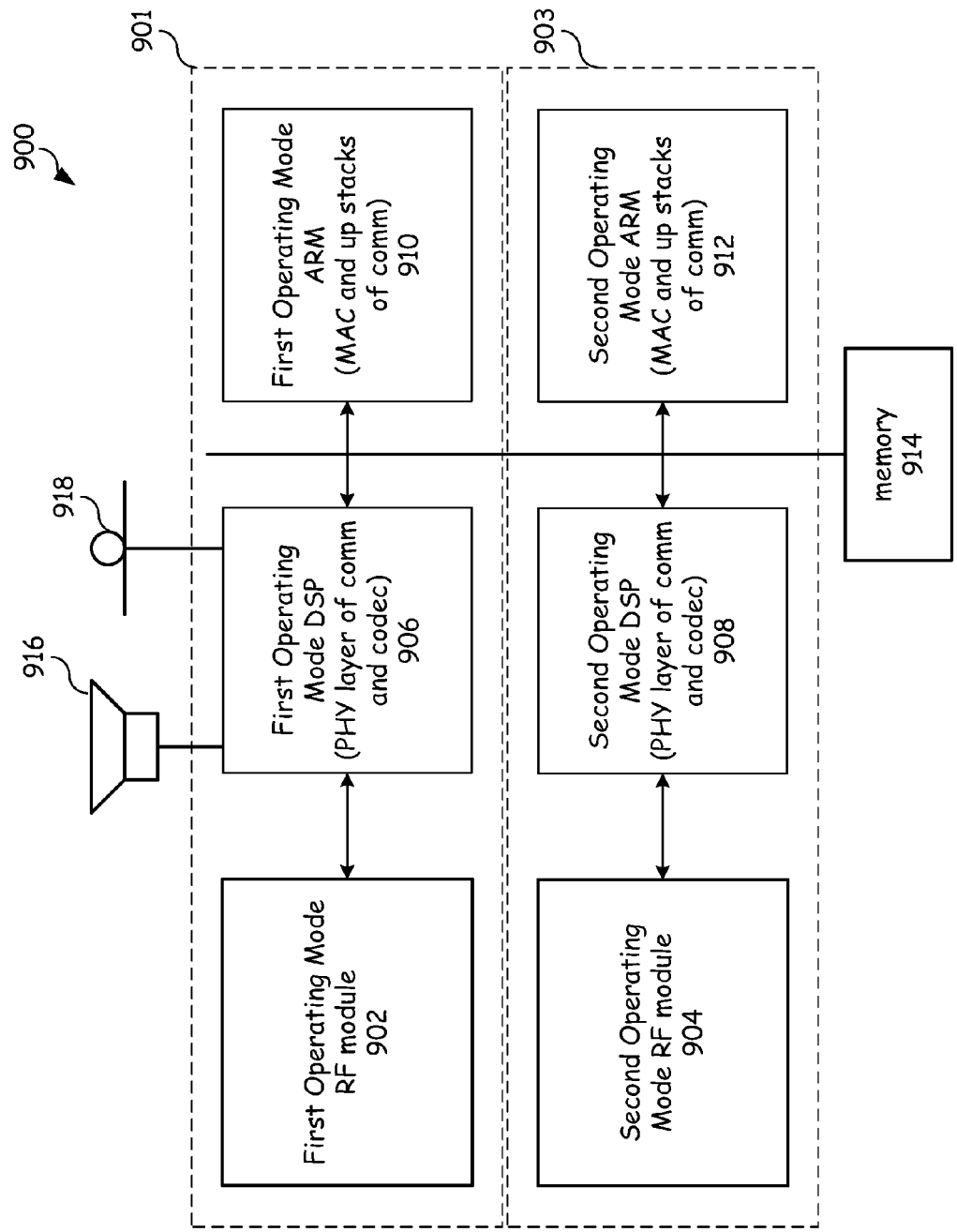
FIG. 9 is a schematic block diagram of another embodiment of an RFIC in accordance with the present invention.

FIG. 9 is a schematic block diagram of an RFIC that includes a first operating mode section 901 and a second operating mode section 903. First operating mode section 901 may include a first operating mode RF processing module 902, a first operating mode DSP 906, and a first operating mode ARM 910. Second operating mode section 903 may include a second operating mode RF processing module 904, a second operating mode DSP 908, and a second operating mode 912. Additionally, multi-mode cellular IC 900 may include a bus 920, a speaker 916, microphone 918 and memory module 914. Memory 914 may include a memory manager that provides pointers to indicate where in memory data resides and when data is available for the DSP and ARM.

In an embodiment, when the RFIC is in a first receive mode, the first RF section 902 converts a first inbound RF signal into a first inbound symbol stream in accordance with the first wireless communication protocol (e.g., GSM, EDGE, WCDMA, GPRS, etc.). In this mode, the first PHY processing module (e.g., DSP 906) converts the first inbound symbol stream into first inbound data in accordance with the first wireless communication protocol. Such a conversion from RF to baseband was previously discussed with reference to one or more of FIGS. 1-6.

The memory 914 stores the first inbound data, which may be inbound digital voice data, inbound digital audio data, inbound digital video data, inbound text message data, inbound graphics data, and/or inbound image data. The memory manager utilizes pointers to indicate where in the memory the first inbound data is stored and further provides an indication as to when the first inbound data may be retrieved from the memory for subsequent processing.

When the first inbound data is available for subsequent processing, the first upper layers processing module (e.g., ARM 910) retrieves the first inbound data from the memory 914 and converts the first inbound data into a first inbound signal. In an embodiment, the upper layers processing module performs the medium access control (MAC) layer, network layer, transport layer, session layer, presentation layer, and application layer functions. The memory 914 stores the first inbound signal, which may be an inbound digital voice signal, an inbound digital audio signal, an inbound digital video signal, an inbound text message signal, an inbound graphics signal, and/or an inbound image signal.

When the first inbound signal is available for retrieval, the first PHY processing module (e.g., DSP 906) retrieves it from the memory 914 and converts it into a first inbound analog signal. For example, if the first inbound analog signal is a voice or audio signal, the PHY processing module provides the analog voice or audio signal to the speaker, which renders the signal audible. In this example the first PHY processing module includes an audio codec to facilitate the digital to analog conversion of the first inbound signal. As another example, when the first inbound analog signal is a text or video signal, the PHY processing module provides the analog text or video signal to the display interface for subsequent display.

When the RFIC is in a second receive mode, the second RF section 904 converts a second inbound RF signal into a second inbound symbol stream in accordance with a second wireless communication protocol (e.g., GSM, EDGE, WCDMA, GPRS, etc.). Then, the second PHY processing module (e.g., DSP 908) converts the second inbound symbol stream into second inbound data in accordance with the second wireless communication protocol.

The memory 914 stores the second inbound data, which may be inbound digital voice data, inbound digital audio data, inbound digital video data, inbound text message data, inbound graphics data, and/or inbound image data. The memory manager utilizes pointers to indicate where in the memory the second inbound data is stored and further provides an indication as to when the second inbound data may be retrieved from the memory for subsequent processing.

When the second inbound data is available for subsequent processing, the second upper layers processing module (e.g., ARM 912) retrieves the second inbound data from the memory 914 and converts it into a second inbound signal. In an embodiment, the upper layers processing module performs the medium access control (MAC) layer, network layer, transport layer, session layer, presentation layer, and application layer functions. The memory 914 stores the second inbound signal, which may be an inbound digital voice signal, an inbound digital audio signal, an inbound digital video signal, an inbound text message signal, an inbound graphics signal, and/or an inbound image signal.

When the second inbound signal is available for retrieval, the first PHY processing module (e.g., DSP 906) retrieves it from the memory 914 and converts it into a second inbound analog signal. For example, if the second inbound analog signal is a voice or audio signal, the PHY processing module provides the analog voice or audio signal to the speaker, which renders the signal audible. In this example the first PHY processing module includes an audio codec to facilitate the digital to analog conversion of the first inbound signal. As another example, when the second inbound analog signal is a text or video signal, the PHY processing module provides the analog text or video signal to the display interface for subsequent display.

In another embodiment, the first PHY processing module may include an audio processing module and an audio codec. The audio processing module is coupled to decompress the first or second inbound signal to produce a decompressed audio signal. For example, the audio processing module may use an MP3, or other digital audio, algorithm to decompress the inbound signal. The audio codec is coupled to convert the decompressed audio signal into the first or second inbound analog signal.

In another embodiment, the memory 914 may store a multimedia file (e.g., a digital audio file, a digital video file, a digital image file, a text message, a graphics file, etc.) The first upper layers processing module (e.g., ARM 9100 retrieves the multimedia file from memory and converts the multimedia file into the first inbound signal. The first PHY processing module (e.g., DSP 908) converts the first inbound signal into the first inbound analog signal (e.g., an analog voice signal, an analog audio signal, an analog video signal, an analog text signal, an analog graphics signal, etc.)

In another embodiment, when the RFIC is in a first transmit mode, the first PHY processing module converts a first outbound analog signal into a first outbound signal. The first outbound analog signal may be a first outbound analog audio signal, a first outbound analog video signal, and/or a first outbound analog text/graphics signal and the first outbound signal may be a first outbound digital audio signal, a first outbound digital video signal, and/or a first outbound digital text/graphics signal.

The memory 914 stores the first outbound signal. The memory manager utilizes pointers to indicate where in the memory the first outbound data is stored and further provides an indication as to when the first outbound data may be retrieved from the memory for subsequent processing.

The first upper layers processing module converts the first outbound signal into first outbound data, which is stored in memory 914. The first PHY processing module retrieves the first outbound data from the memory and converts it into a first outbound symbol stream in accordance with the first wireless communication protocol. The first RF section converts the first outbound symbol stream into a first outbound RF signal in accordance with the first wireless communication protocol.

When the RFIC is in a second transmit mode, the first PHY processing module converts a second outbound analog signal into a second outbound signal. In an embodiment, the second outbound signal includes a second outbound digital audio signal, a second outbound digital video signal, and/or a second outbound digital text/graphics signal and the second outbound analog signal includes a second outbound analog audio signal, a second outbound analog video signal, and/or a second outbound analog text/graphics signal. The memory stores the second outbound signal.

The second upper layers processing module converts the second outbound signal into second outbound data, which is stored in memory 914. The second PHY processing module retrieves the second outbound data from the memory and converts it into a second outbound symbol stream in accordance with the second wireless communication protocol. The second RF section converts the second outbound symbol stream into a second outbound RF signal in accordance with the second wireless communication protocol.

In an embodiment, the first PHY processing module includes an audio codec that converts a first outbound analog audio signal into the first outbound signal and to convert a second outbound analog audio signal into the second outbound signal. In another embodiment, the first PHY processing module includes an audio codec and an audio processing module. The audio codec converts first or second outbound analog audio signals into an outbound digital audio signal and the audio processing module compresses the outbound digital audio signal to produce the first or second outbound signal.

Figure 10:
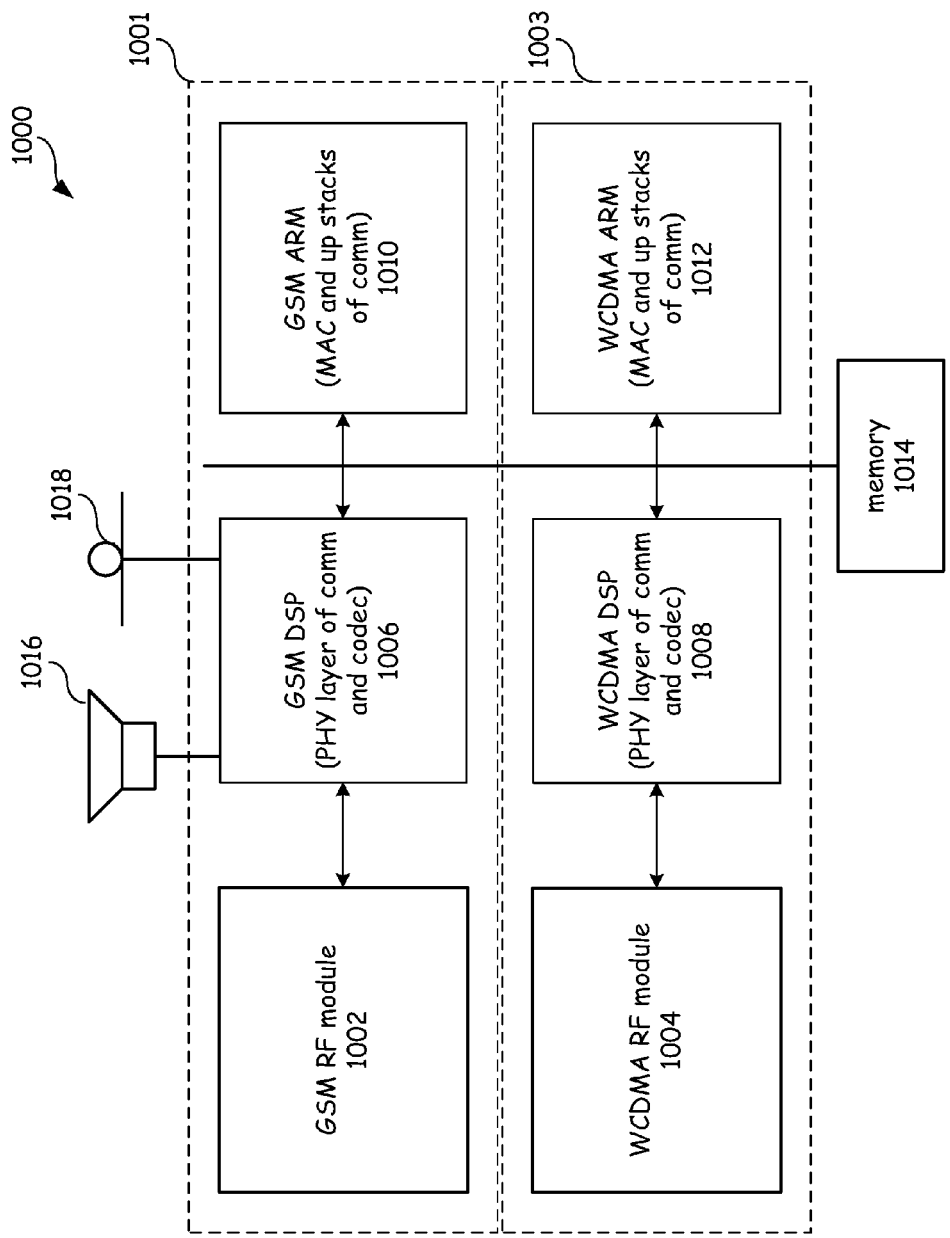
FIG. 10 is a schematic block diagram of another embodiment of an RFIC in accordance with the present invention.

FIG. 10 is a schematic block diagram of a multimode cellular-wireless area network and/or voice/data/RFIC similar to FIG. 9, but specific to GSM and WCDMA in accordance with embodiments of the present invention. Multi-mode cellular-wireless RF IC 1000 includes a GSM section 1001 and a WCDMA section 1003. GSM section 1001 may include a GSM RF processing module 1002, a GSM DSP 1006, and a GSM ARM 1010. WCDMA section 1003 may include a WCDMA RF processing module 1004, a WCDMA DSP 1008, and a WCDMA 1012. Additionally, multi-mode cellular IC 1000 may include a bus 1020, a speaker 1016, microphone 1018 and memory module 1014. Memory 1014 may be used to provide pointers to indicate where in memory data resides and when data is available for the DSP and ARM. For example, in GSM mode, data between DSP 1006 and ARM 1010 may be conveyed via memory 1014 where pointers are used to indicate where in memory 1014 data resides and when the data is available. In WCDMA mode, the GSM DSP 1006 may be used to perform voice coding and de-coding and thus is coupled to speaker 1016 and microphone 1018. In this mode, the GSM DSP 1006, the WCDMA DSP 1008, and WCDMA ARM 1012 again may use pointers to indicate where in memory 1014 data resides and when the data is available.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) integrated circuit (IC) comprises:
    a signal receiving section operably coupled to:
        convert a cellular data inbound RF signal into a cellular data inbound symbol stream;
        obtain a wireless local area network (WLAN) inbound symbol stream;
    an audio codec operable to convert an output digital signal into an output voice signal;
    a bus matrix operably coupled to the audio codec; and
    a processing unit operably coupled to the signal receiving section and the bus matrix, wherein the processing unit is operable to:
        convert the cellular data inbound symbol stream into a first voice over internet protocol (VoIP) signal;
        convert the WLAN inbound symbol stream into a second VoIP signal; and
        facilitate providing, via the bus matrix, at least one of the first and second VoIP signals to the audio codec as the output digital signal.

2. The RFIC of claim 1, wherein the signal receiving section comprises:
    a radio frequency (RF) section operably coupled to convert the cellular data inbound RF signal into the cellular data inbound symbol stream;
    a WLAN interface operably coupled to receive the WLAN inbound symbol stream from a WLAN transceiver.

3. The RFIC of claim 1, wherein the signal receiving section comprises:
a first radio frequency (RF) section operably coupled to convert the cellular data inbound RF signal into the cellular data inbound symbol stream; and
a second RF section operably coupled to convert a WLAN inbound RF signal into the WLAN inbound symbol stream.

4. The RFIC of claim 1 further comprises:
a Bluetooth interface operably coupled to the bus matrix and operable to output a Bluetooth digital signal to a Bluetooth transceiver; and
the processing unit is further operably coupled to facilitate providing, via the bus matrix, at least one of the first and second VoIP signals to the Bluetooth interface as the Bluetooth digital signal.

5. The RFIC of claim 1, wherein the processing unit comprises:
a baseband processing module operable to convert the cellular data inbound symbol stream into inbound data; and
a processing module operable to:
convert the inbound data into the first VoIP signal; and
facilitate providing, via the bus matrix, at least one of the first and second VoIP signals to the audio codec.

6. The RFIC of claim 1, further comprising a keyboard interface coupled to the bus matrix.

7. The RFIC of claim 1, further comprising a camera interface coupled to the bus matrix.

8. A radio frequency (RF) integrated circuit (IC) comprising:
a signal receiving section configured to:
convert a cellular data inbound RF signal into cellular data;
convert a received wireless local area network (WLAN) inbound signal into WLAN data;
an audio codec configured to convert a digital audio signal into an output audio signal;
a bus matrix coupled to the audio codec; and
a processing unit coupled to the signal receiving section and to the bus matrix and configured to:
convert the cellular data into a first voice over internet protocol (VoIP) signal;
convert the WLAN data into a second VoIP signal; and
control the bus matrix to deliver at least one of the first and second VoIP signals to the audio codec as the digital audio signal.

9. The RFIC of claim 8, wherein the signal receiving section comprises:
a cellular interface configured to convert the cellular data inbound RF signal into the cellular data; and
a WLAN interface configured to receive the WLAN inbound signal from a WLAN transceiver and to convert the WLAN inbound signal into the WLAN data.

10. The RFIC of claim 8, wherein the signal receiving section comprises:
a cellular interface configured to convert the cellular data inbound RF signal into the cellular data; and
a WLAN interface configured receive a WLAN inbound RF signal, to convert the WLAN inbound RF signal into the WLAN inbound signal, and to convert the WLAN inbound signal into the WLAN data.

11. The RFIC of claim 8, further comprising:
a Bluetooth interface coupled to the bus matrix and configured to output a Bluetooth digital signal to a Bluetooth transceiver; and
the processing unit further configured to provide, via the bus matrix, at least one of the first and second VoIP signals to the Bluetooth interface as the Bluetooth digital signal.

12. The RFIC of claim 8, wherein the signal receiving section comprises:
a radio frequency (RF) section configured to convert the cellular data inbound RF signal into a baseband cellular data inbound symbol stream; and
a baseband processing module configured to convert the baseband cellular data inbound symbol stream into the cellular data.

13. The RFIC of claim 8, further comprising a keyboard interface coupled to the bus matrix.

14. The RFIC of claim 8, further comprising a camera interface coupled to the bus matrix.

15. A method for operating a radio frequency (RF) integrated circuit (IC) comprising:
receiving a cellular data inbound RF signal;
converting the cellular data inbound RF signal into cellular data;
converting a received wireless local area network (WLAN) inbound signal into WLAN data;
converting the cellular data into a first voice over internet protocol (VoIP) signal;
converting the WLAN data into a second VoIP signal;
controlling a bus matrix to deliver at least one of the first and second VoIP signals to an audio codec as a digital audio signal; and
the audio codec converting the digital audio signal into an output audio signal.

16. The method of claim 15, further comprising converting a WLAN inbound RF signal into the WLAN inbound signal.

17. The method of claim 15, further comprising providing, via the bus matrix, at least one of the first and second VoIP signals to a Bluetooth interface as the Bluetooth digital signal.

18. The method of claim 15, further comprising receiving keyboard data via a keyboard interface coupled to the bus matrix.

19. The method of claim 15, further comprising receiving a camera signal via a camera interface coupled to the bus matrix.

20. The method of claim 15, further comprising outputting a display signal via a display interface coupled to the bus matrix.

* * * * *

UNITED STATES PATENT AND TRADEMARK OFFICE
CERTIFICATE OF CORRECTION

PATENT NO. : 8,838,028 B2  
APPLICATION NO. : 13/049566  
DATED : September 16, 2014  
INVENTOR(S) : Rofougaran et al.

Page 1 of 1

It is certified that error appears in the above-identified patent and that said Letters Patent is hereby corrected as shown below:

On the Title page, item (*): Insert --This patent is subject to a terminal disclaimer.--

In the claims

Col. 20, line 3, in claim 10: after "interface configured" insert --to--

Signed and Sealed this  
Twenty-eighth Day of June, 2016

Michelle K. Lee  
*Director of the United States Patent and Trademark Office*